United States Patent [19]
Kessler

[11] 3,859,592
[45] Jan. 7, 1975

[54] ELECTRICAL RC ELEMENT

[75] Inventor: Hartmut Kessler, Regensburg, Germany

[73] Assignee: Siemans Aktiengesellschaft, Berlin & Munich, Germany

[22] Filed: May 3, 1973

[21] Appl. No.: 357,008

[30] Foreign Application Priority Data
May 8, 1972 Germany.............................. 2222546

[52] U.S. Cl....................... 323/78, 333/79, 317/256
[51] Int. Cl............................................... H01g 1/16
[58] Field of Search ...... 333/79; 317/260, 256, 261; 323/78, 77

[56] References Cited
UNITED STATES PATENTS

| | | | |
|---|---|---|---|
| 2,126,915 | 8/1938 | Norton............................ | 317/256 X |
| 2,518,225 | 8/1950 | Dorst.................................... | 338/78 |
| 3,513,368 | 5/1970 | Boyer............................. | 317/260 X |

OTHER PUBLICATIONS

Dommer Fixed & Variable Capacitors, McGraw Hill, N.Y; 1960, p. 89.

Primary Examiner—E. A. Goldberg
Attorney, Agent, or Firm—Hill, Gross, Simpson, Van Santen, Steadman, Chiara & Simpson

[57] ABSTRACT

Electrical RC elements comprised of dielectric foils and electrically conductive layers which are arranged alternately to form a stack wherein at least one of the conductive layers is formed of a high-resistance material, such as a chromium-nickel alloy and alternate conductive layers are staggered in relation to each other with at least one of the conductive layers being end-contacted. In preferred embodiments, such stacked layers are wound into a coil structure and include at least two insulating foils to prevent short-circuiting.

17 Claims, 27 Drawing Figures

ELECTRICAL RC ELEMENT

BACKGROUND OF THE INVENTION

1. Field of the Invention

The invention relates to electrical RC elements (i.e. elements including at least one resistor and at least one capacitor in a stack, including high-resistance layers and dielectric foils, which may carry low-resistance layers) arranged alternately one above the other.

2. Prior Art

RC elements composed of a plurality of resistance and insulating layers arranged alternately one above another are known. A capacitive network including a starting capacitance made up of stacked conductive coatings and dielectric layers is also known wherein the starting capacitance is divided up to form a desired network configuration by incisions which extend at least over the entire width of the area of overlap of oppositely poled coatings. It is also known to use a capacitive network of this type as an XY-interference suppression capacitor in layer constructions. In such suppression capacitors, the starting capacitance is formed as a layer construction from two regions, with different types of coatings and including an incision or cut from one end face.

A columnar module assembly of layer construction is also known wherein insulating layers are stacked at intervals one above another to divide capacitor electrode layers from one another and current is supplied at the side face of the columnar body. In such an arrangement, the electrical connection between individual electrode supply lines is effected in part by low-resistance conductor paths provided on the side faces or by means of electrical resistance layers. It is also known to effect electric contact between stacked capacitor electrodes by means of metallized bores through the insulating layers or by depositing electrical conductor paths and resistances on the upper face of a stacked capacitor.

SUMMARY OF THE INVENTION

The invention provides an electrical RC element having distributed resistances and capacitances.

It is a novel feature of the invention to provide an electrical RC element comprised of insulating foils and electrically conductive layers arranged alternately in a stack, with at least one of the conductive layers including a high-resistance material and alternate conductive layers being staggered with respect to one another and at least one of the conductive layers being end-contacted.

It is another novel feature of the invention to provide very compact RC elements which are easily mass-produced. The charged and discharge characteristics of such RC elements may be varied or adjusted after the initial or master stack is completed by providing incisions in the stack and by selecting the number and length of such incisions. The RC ratio is determined independently of further processing of an RC element, by an initial selection of conductive layers and dielectric foils used therein.

Other and further features of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and spirit and scope of the appendant claims.

DESCRIPTION OF PREFERRED EMBODIMENTS

Figure 1:
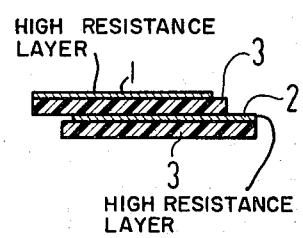
FIGS. 1, 2 and 3 are, respectively, a schematic side elevational view, a schematic plan view and a circuit diagram of an exemplary embodiment of the invention.

The invention provides RC elements formed of insulating foils and electrically conductive layers arranged alternately so as to form a stack wherein at least one of the conductive layers is a high-resistance layer and alternate conductive layers are staggered with respect to one another and at least one conductive layer (or a set of conductive layers) is end-contacted.

In certain preferred embodiments, stacked layers are wound into a coil, similar to a wound capacitor and include, of course, at least two insulating foils to prevent short-circuiting.

The RC elements of the invention are very compact and are readily mass-produced. The charge and discharge characteristics of the RC combination may be selected within wide parameters and the electrical characteristics may be varied or compensated even after the initial stack has been completed, with incisions and appropriately selecting the number and length of incisions used. The RC ratio is determined independently of further processing of the RC element by the proper selection of conductive layers and dielectric foils.

The RC elements of the invention may be produced by metallizing or coating one or both sides of synthetic resin foil strips in a conventional manner. In embodiments where low-resistance layers are utilized, they should possess a surface resistance on the order of magnitude of $1\Omega$/square and such layers may advantageously be composed of aluminum. High-resistance layers should possess a surface resistance on the order of magnitude ranging from 10Ω/square to above 10MΩ/square and may be composed of a chromium-nickel alloy, of a high-resistance metal oxide, such as for example indium oxide or of carbon. In certain embodiments, the conductive layers may be composed of layers of synthetic resin material which directly conduct electrical current, i.e. synthetic resin foils which have been rendered electrically conductive by embedding metal particles therein.

Coatings on the insulating or dielectric foils can be divided up into a plurality of subsidiary coatings in a conventional manner by uncoated longitudinal strips. Alternatively, the foils themselves may be divided into separate strips and spaced apart from each other at a sufficient distance for the intended function, especially where the conductive layers are foils having an inherent conductivity. Further, the coatings can be made of such a low-resistance at the lateral edges provided for contacting, such as by reinforcing the coating and/or by the application of an auxiliary low-resistance layer, that satisfactory end-contacting is readily attainable. This concept is especially advantageous with foils having high-resistance coatings.

The conductive coatings in individual planes of a stack are preferably not all connected to external terminals. This arrangement provides a series connection of capacitance at various planes between one another and provides a reduction in capacitive value and an increase in dielectric strength.

The conductive coatings in individual stack planes may be conventionally connected to external terminals at several points. If these terminals are connected to or carry different potentials, an electric resistance is attained between the two terminals. On the other hand, if the terminals carry the same potential, a change in the RC characteristics is attained.

The insulating foils and conductive coatings may be conveniently wound into coils to form layers one above another, as in a wound or layer capacitor and additional foils function, in the usual manner, as insulating and mechanical protective layers. Further, the metal strips projecting at an end face may be used to effect a division of the RC element into a plurality of component layers. During winding, the lateral end-face foil edges may be arranged in a known staggered fashion so that the conductive coatings which are to be contacted at an end-face are covered at their edges at that face by the contacting material (which can be applied, for example, by the well-known Schoop-process), while the coatings which are to remain free of contact at that end-face, remain covered.

The insulating foils and conductive layers may be stacked in a constantly repetitive sequence within an overall RC element; this is the so-called simple construction. However, a plurality of different layer sequences may also be advantageously stacked one above another; this is the so-called multiple construction. In multiple constructions, additional insulating foils may be included between individual layer sequences in order to provide a specific insulation path.

Electrical isolation of individual layer sequences is achieved, even after end-contacting by means of the Schoop-process has been effected, by embedding insulating foils between the individual layer sequences so that such additional foils project at one or both end faces sufficiently to cause the end contacted layers of the various individual layer sequences to remain electrically isolated from one another (i.e. the so-called longitudinal isolation). This arrangement provides three or more connection possibilities for an external current supply and embodiments utilizing such an arrangement may be produced as four-pole, six-pole, etc. elements.

The individual RC elements may be subsequently split-off from (e.g., sawn away from) the initial or master stack, which is produced in the form of long strips or rings, with the length of the cut functioning in a known manner to determine the capacitance or resistance of the element. The RC elements may be further altered by incisions which begin at one end contact face and terminate prior to the other end contact face. Basically, such incisions from one end face provide parallel connections while incisions from both end faces provide series connections. Depending on the desired RC combination, an incision may extend over the entire width of the overlap area of oppositely poled coatings or it may be shorter than the overlap area.

The RC elements of the invention are useful, for example, as spark-quenching elements, as high-pass filters, as low-pass filters, as frequency-independent voltage-dividers, as switching networks between amplifier stages, as RC transit-time elements, as phase-rotation elements, etc.

Figure 2:
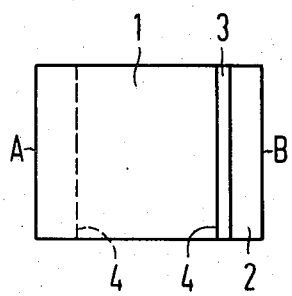
Figure 3:
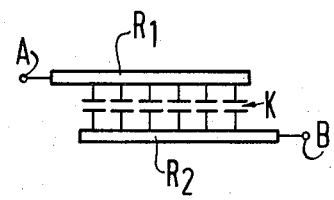

Referring now to the drawings, FIGS. 1-3 illustrate an RC element which can be produced in the manner of a layer capacitor. As shown at FIG. 1, a first high-resistance coating 1 and a second high-resistance coating 2 are applied on the respective sides of an insulating foil 3. The coatings 1 and 2 are staggered in respect to one another to enable end-contacting to be effected without causing a short circuit.

FIG. 2 shows a plan view of the element illustrated at FIG. 1. The first coating 1 forms a contact A while the second coating 2 forms a contact B. The edge of coating 1 is indicated by reference numeral 4.

FIG. 3 shows the equivalent electrical circuit diagram of the element shown at FIGS. 1 and 2. The electric contact A is connected with a resistance $R_1$ formed by the first high-resistance coating 1. The electrical contact B is connected to resistance $R_2$ formed by the second high-resistance coating 2. A distributed capacitor K is arranged between the two resistors $R_1$ and $R_2$.

The high-resistance coatings 1 and 2 may be formed, for example, of a chromium-nickel alloy, of indium oxide, of tin oxide, of carbon or of any other suitable high-resistance material.

Figure 4:
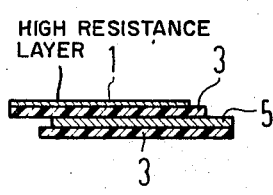
FIGS. 4, 5 and 6 are views similar to those of FIGS. 1, 2 and 3, respectively, of another exemplary embodiment of the invention.
Figure 5:
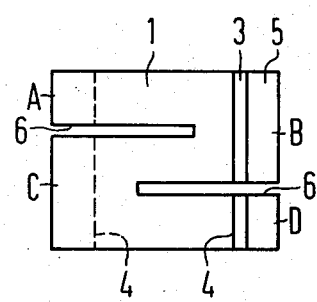
Figure 6:
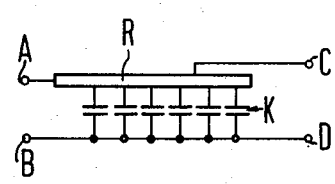

In the embodiment illustrated at FIGS. 4–6, a pair of insulating foils 3 are, respectively, coated on one side thereof with a high-resistance coating 1 and with a low-resistance coating 5 and are stacked in a staggered relation in respect to one another as shown. A total of four contact terminals, A, B, C and D, are attained by means of two incisions 6, 6 (FIG. 5) extending crosswise partially into the stack from the two respective end faces thereof. As shown at FIG. 6, a four-pole element is thus formed with a tapped resistance R and a distributed capacitance K.

Figure 7:
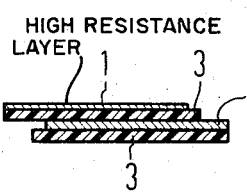
FIGS. 7, 8 and 9 are views similar to those of FIGS. 1-3, respectively, of yet another exemplary embodiment of the invention.
Figure 8:
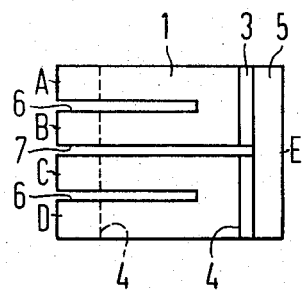
Figure 9:
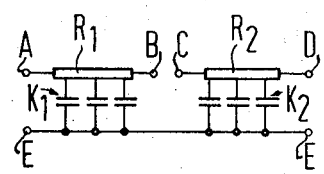

FIGS. 7-9 show a further embodiment of the invention wherein two insulating foils 3 are, respectively, coated on one side thereof with a high-resistance coating 1 and a low-resistance coating 5. As shown in FIG. 8, three incisions 6, 7 and 6 are sawn transversely into an element so formed from one end face. The center incision 7 extends through the entire overlap area of the oppositely poled coatings while the other cuts 6, 6 do not. This arrangement provides a total of five contact terminals A, B, C, D and E and, as shown at FIG. 9, provides two RC four-pole elements, consisting of the resistors and capacitors $R_1K_1$ and $R_2K_2$ and a single common ground line.

Figure 10:
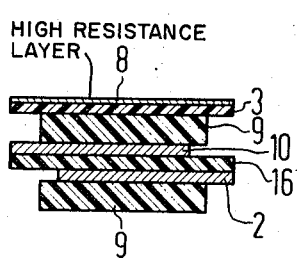
FIGS. 10, 11 and 12 are views similar to those of FIGS. 1, 2 and 3, respectively, of a further exemplary embodiment of the invention.
Figure 11:
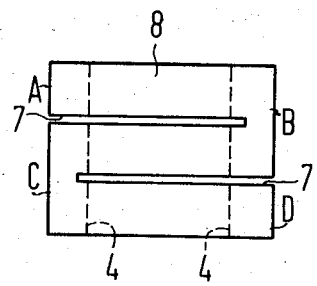
Figure 12:
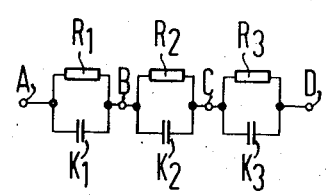

In the embodiments of the invention illustrated at FIGS. 10 to 12, the upper insulating foil 3 is completely covered on one side with a high-resistance coating 8 and the other side of foil 3 is partially covered with an insulating foil 9, which is thicker than foil 3. An insulating foil 16, metallized on both sides thereof with low-resistance coatings 10 and 2, is arranged so that coating 10 contacts foil 9. A second relatively thick insulating foil 9 is provided in contact with coating 2. As shown at FIG. 11, two incisions 7, 7 are provided from opposite end faces and extend through the entire overlap area of the oppositely poled coatings to provide four external connections, A, B, C and D. As shown in FIG. 12, such an arrangement produces a series connection of three resistors, $R_1$, $R_2$ and $R_3$ which are in each case shunted by a capacitor $K_1$, $K_2$ and $K_3$, respectively. This type of element may be used, for example, as a frequency-compensated voltage-divider. An advantage of this embodiment includes the fact that as a result of the pre-selection of conductive coatings and insulating foils, the RC ratio is constant for all resistance values. Therefore, the position of the incisions may be determined exactly in accordance with a desired voltage-divider ratio and the correct value of the compensation capacitance K will always be automatically obtained.

Figure 13:
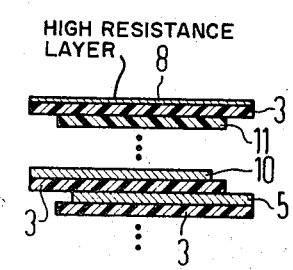
FIGS. 13, 14 and 15 are views similar to those of FIGS. 1-3, respectively, of yet a further exemplary embodiment of the invention.
Figure 14:
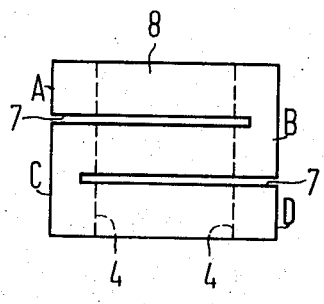
Figure 15:
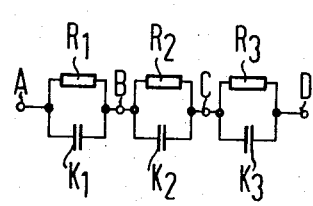

Another embodiment of a compensated voltage-divider is shown at FIGS. 13–15. In this embodiment, the element is constructed from two different layer regions. A first layer region is formed of an insulating foil 3 which is completely covered on one side thereof with a high-resistance coating 8 and partially covered on the other side by an intermediate insulating foil 11. A second layer region is formed of two insulating foils 3, each coated on one side thereof with a low-resistance coating 5 and 10. It will be noted that coatings 5 and 10 are arranged in staggered relation to one another. As shown at FIG. 14, two reciprocal cuts or incisions 7, 7 are provided and extend crosswise from opposite end faces over the entire overlap area of the oppositely poled coatings. As best seen at FIG. 15, this forms a series connection of three resistors $R_1$, $R_2$ and $R_3$ which are shunted with the aid of capacitors $K_1$, $K_2$ and $K_3$.

Figure 16:
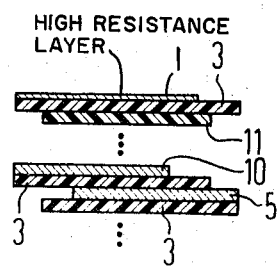
FIGS. 16, 17 and 18 are views similar to those of FIGS. 1-3, respectively, of another exemplary embodiment of the invention.
Figure 17:
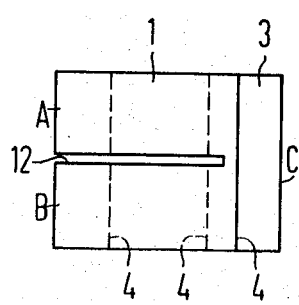
Figure 18:
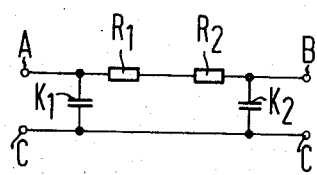

An embodiment of a RC element having low-pass characteristics is illustrated at FIGS. 16–18. A foil 3 of an insulating material is coated on one side with a high-resistance coating 1 and an uncoated intermediate foil 11 is placed on the other side of foil 3 so as to form a first layer zone. A second layer zone is formed by two insulating foils 3, each of which are coated on one side with a low-resistance coating 5 and 10 respectively. It will be noted that coatings 1 and 10 are arranged so that they both can be contacted at the same end face and that these two coatings are of different widths. A single incision 12, best seen at FIG. 17, extends from one end face transversely into the formed stack and is longer than the width of coating 10 but shorter than the width of coating 1. This arrangement provides three terminals, A, B and C, and results in the equivalent circuit diagram shown at FIG. 18.

Figure 19:
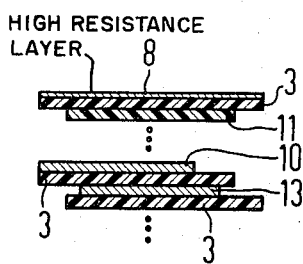
FIGS. 19, 20 and 21 are views similar to those of FIGS. 1-3, respectively, of a further exemplary embodiment of the invention.
Figure 20:
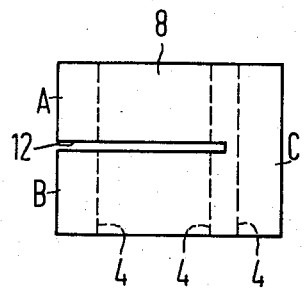
Figure 21:
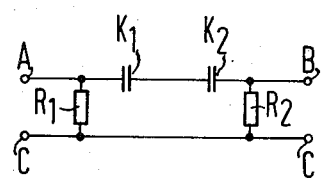
Figure 22:
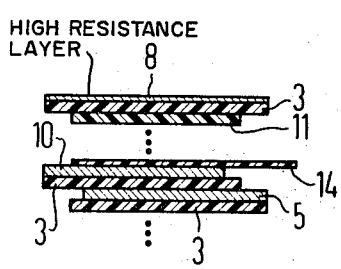
FIGS. 22, 23 and 24 are, respectively, a schematic side-sectional view, a schematic side view, and a schematic plan view of yet another exemplary embodiment of the invention.

FIGS. 19–21 illustrate an embodiment having a high-pass characteristic. A first layer zone is formed of an insulating foil 3 which has one complete side thereof coated with a high-resistance coating 8 and, along the other side, has an intermediate foil 11. A second layer zone is formed by a first insulating foil 3 having a low-resistance coating 10 on one side thereof and a second insulating foil 3 having a low resistance coating 13 on a similar side thereof. It will be noted that coating 13 is so arranged that it cannot be contacted at either of the end faces. An incision 12 is provided to extend from one end face for a distance greater than the width of coating 10 but less than the width of coating 13. This arrangement produces three electrical connecting points, A, B and C, and results in the high-pass filter diagrammatically shown at FIG. 21.

Figure 23:
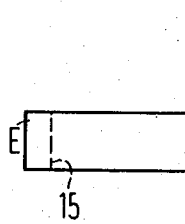
Figure 24:
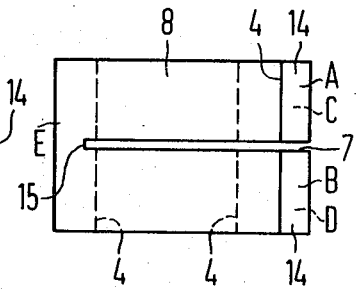
Figure 25:
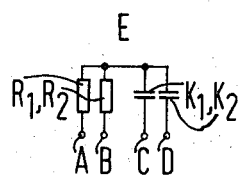
FIGS. 25, 26 and 27 are each circuit diagrams of alternate uses of the exemplary embodiments illustrated at FIGS. 22-24.
Figure 26:
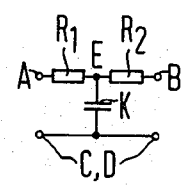
Figure 27:
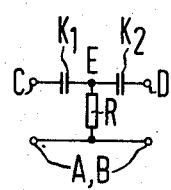

FIGS. 22 through 27 illustrate further exemplary embodiments of RC elements in accordance with the principles of the invention. Two layer zones are separated from one another by an insulating foil 14, which projects on one side beyond that end face and thus provides individual electric contacts at such face. A first layer zone is formed by an insulating foil 3, one side of which is completely covered with a high-resistance coating 8 and the other side of which is partially covered with an intermediate foil 11. Below the projecting insulating foil 14, two further insulating foils 3 are stacked, each of which are coated on one side thereof with a low-resistance coating 10 and 5 respectively, which are in staggered relation to one another. FIG. 23 illustrates a side view of the stack produced in this manner. The separation foil 14 which projects on the right, beyond the end face and the end 15 of an incision 7 are shown at FIG. 24. Above the separation foil 14, on the right-hand side of FIG. 24, terminals A and B result and below foil 14, terminals C and D result. On the left-hand side of this element, a common ground terminal E is provided. As best seen in FIG. 24, an incision 7 is provided and extends transversely over the entire overlap area of the oppositely poled coatings. FIGS. 25, 26 and 27 illustrate equivalent circuit diagrams attainable with the element shown at FIGS. 22–24. Depending upon the wiring of the individual terminals A, B, C and D, one may attain either two resistors $R_1$ and $R_2$ and two capacitors $K_1$ and $K_2$, which are connected to a common ground line E, as best seen in FIG. 25, or as shown at FIG. 26, a four-pole having low-pass characteristics, or as shown at FIG. 27, a four-pole having high-pass characteristics.

It will be appreciated that starting from a standard initial or master RC element of the invention, it is possible to produce different types of RC combinations, such as two-poles, four-poles, six-poles, etc. by suitable application and combination of the disclosed principles of the invention. Further, each layer zone need not be limited to only two oppositely poled coatings as suggested by the drawings; it is possible, in fact, to provide a plurality of correspondingly parallel connected coatings in order to increase the capacitance of a select element.

Further modifications, variations and alterations may readily occur to those skilled in the art and it will be understood that these may be effected without departing from the spirit and scope of the novel concepts of the invention.

I claim as my invention:

1. An electrical RC element comprising a plurality of insulating foils, at least two of which are provided with an electrically conductive layer on a face thereof, said foils and layers being arranged alternately to form a stack, at least one pair of adjacent conductive layers having at least one insulating foil therebetween, at least one of said conductive layers being a high-resistance layer and at least one of said conductive layers being a low-resistance layer, with only one conductive layer being disposed on a respective foil, and alternate conductive layers staggered with respect to one another, said stack having at least one transverse incision therein extending from one end face of the stack in all layers and foils thereof, and at least said conductive layer of high resistance being positioned for end contact with an external current source.

2. An element as defined in claim 1 wherein some of said conductive layers are formed of aluminum.

3. An element as defined in claim 1 wherein said high-resistance layer is formed of a chromium-nickel alloy.

4. An element as defined in claim 1 wherein said high-resistance layer is formed of a high-resistance metal oxide.

5. An element as defined in claim 1 wherein said high-resistance layer is formed of carbon.

6. An element as defined in claim 1 wherein some of said conductive layers are formed of an electrically conductive foil of synthetic resin material.

7. An element as defined in claim 1 wherein said conductive layers are each divided up into a plurality of laterally disposed sublayers mutually insulated from one another.

8. An element as defined in claim 1 wherein only some of said conductive layers are connected to an external current source.

9. An element as defined in claim 1 wherein at least some of said conductive layers are each connected to an external current source at a plurality of points.

10. An element as defined in claim 1 wherein said stack includes additional insulating foils.

11. An element as defined in claim 1 wherein at least one insulating foil extends beyond at least one end face of the stack.

12. An element as defined in claim 1 wherein said stack includes a plurality of similar stacked layer sequences.

13. An element as defined in claim 1 wherein said stack includes at least two different stacked layer sequences.

14. An element as defined in claim 1 wherein said transverse incision extends over the entire width of the overlap area between oppositely poled conductive layers.

15. An element as defined in claim 1 wherein said stack includes at least one transverse incision extending from each end face thereof.

16. An element as defined in claim 1, wherein said element comprises at least three conductive layers, forming at least two such pairs of adjacent conductive layers.

17. An element as defined in claim 1, wherein a conductive layer positioned for end contacting is low ohmic and is common to a plurality of RC components forming the element.

* * * * *